United States Patent Office 2,700,048
Patented Jan. 18, 1955

2,700,048

PROCESS OF PRODUCING ORGANOMETALLIC COMPOUNDS

Fritz Schmidt, Leverkusen, Germany, assignor to Farbenfabriken Bayer Aktiengesellschaft, Leverkusen, Germany, a corporation of Germany No Drawing. Application August 8, 1951,
Serial No. 240,972

Claims priority, application Germany August 19, 1950

6 Claims. (Cl. 260—439)

The present invention relates to a process of producing organometallic compounds, particularly to a process of producing organic compounds of titanium, iron and aluminium.

In accordance with the present invention organometallic compounds of the metals titanium, iron and aluminium, are obtained by causing a substituted or unsubstituted alkylene oxide to react with an anhydrous halide of the corresponding metal, such as $TiCl_4$, $FeCl_3$ and $AlCl_3$. The new process gives rise to compounds which are soluble in many organic solvents, for instance benzene, acetic ester, acetone, alcohol, gasoline and which yield the corresponding metallic hydroxides on admixture of water. By the reaction of alkylene oxides with the said metal halides compounds of the type of metal alcoholates are likely to be obtained.

In carrying out the process of the present invention it is preferred to employ chlorides of the metals for economic reasons; however, it is equally possible to use instead of chlorides other halides, for instance bromides. Examples of suitable alkylene oxides include ethylene oxide, propylene oxide, epichlorohydrin, cyclohexene oxide and phenoxy propylene oxide.

The process of the present invention may be carried out, for instance, by dissolving titanium tetrachloride or sublimated ferric chloride or anhydrous aluminium chloride, preferably in an organic solvent, such as alcohol, benzene, carbon tetrachloride, and gradually adding thereto alkylene oxide which may be likewise dissolved in an organic solvent. The reaction of at least 3 mols of alkylene oxide upon 1 mol of iron or aluminium, and the reaction of at least 4 mols of alkylene oxide upon 1 mol of titanium halide gives rise to neutral products. By using smaller amounts of alkylene oxide, acid products still containing a halide attached to the metal are obtained. The heat evolved in the reaction is advantageously removed by cooling. The reaction of the alkylene oxide upon the metal halide may also be effected in the absence of solvents. It is sometimes of advantage to carry out the reaction of the alkylene oxide upon the halide in the presence of stabilizers, for instance, higher fatty acids, natural or synthetic resins.

The new process of producing organometallic compounds which probably correspond to the type of metal alcoholates, constitutes a considerable technical advance over the hitherto used methods comprising, for instance, the reaction of alkali metal alcoholates upon metallic halides, since no additional steps, for instance, the filtering and washing of precipitates of alkali metal halides, are required according to the present invention.

The products obtained according to the present invention may find application as intermediates in the manufacture of other organometallic compounds or in the manufacture of finely divided metallic hydroxides.

The present invention is further illustrated by the following examples without being restricted thereto.

*Example 1*

100 grams of anhydrous titanium tetrachloride are dissolved in 400 cc. of a dry gasoline fraction boiling within a range of 110–130° C., which are charged in a glass flask provided with a stirrer, a reflux condenser and a thermometer. Thereupon dry ethylene oxide is introduced with stirring. The heat evolved in the reaction of titanium tetrachloride and ethylene oxide is removed by placing the reaction vessel into cold water so as to prevent the temperature exceeding 50° C. Ethylene oxide is added until a sample has a neutral reaction to wet litmus paper. 95 grams of ethylene oxide are totally added. The content of the reaction vessel, which consists of two liquid layers, is separated by the use of a separating funnel. The viscous, clear, almost colorless, specifically heavy layer weighs 210 grams and is the reaction product of titanium tetrachloride and ethylene oxide. This layer contains only small quantities of gasoline and dissolved ethylene oxide which, if desired, may be easily removed by distilling. The specifically lighter layer substantially consists of gasoline and contains only minor quantities of the titanium compound besides little ethylene oxide.

Analysis of the reaction product:
   Found: 34.6% Cl, 18.1% $TiO_2$
   Calculated for $Ti(OC_2H_4Cl)_4$: 38.8% Cl, 21.8% $TiO_2$ In the above reaction, instead of 400 cc. of gasoline, for instance, 350 cc. of carbon tetrachloride may be used under otherwise equal conditions. This reaction gives rise to a clear uniform solution of the reaction product in carbon tetrachloride from which the solvent can be removed, for instance, by vacuum distillation.

*Example 2*

19 grams of titanium tetrachloride are dissolved in 100 cc. of carbon tetrachloride and 42 grams of cyclohexene oxide are dropped into the solution as indicated in Example 1. After distilling off the solvent 60 grams of an almost colorless viscous liquid are obtained which is soluble in acetic ester, benzene, gasoline, alcohol etc. By adding water titanium hydroxide precipitates.

*Example 3*

Ethylene oxide is introduced into a solution of 100 grams of anhydrous ferric chloride in 200 cc. of dry alcohol with stirring and cooling until a sample of the solution indicates an almost neutral reaction to wet indicator paper. A deep red-brown solution is formed from which ferric hydroxide precipitates by adding some water; the addition of another quantity of water gives rise to a colloidal solution.

*Example 4*

162 grams of sublimated ferric chloride are suspended in 100 cc. of dry benzene and 230 grams of propylene oxide are added thereto with stirring and cooling within two hours, care having to be taken that the temperature does not substantially exceed 45° C. The ferric chloride gradually dissolves and a viscous brown liquid with similar properties as that of Example 3 is obtained.

*Example 5*

133 grams of anhydrous aluminium chloride are dissolved in 500 cc. of dry ether and 278 grams of epichlorohydrin are dropped into the resulting solution with stirring and external cooling with ice water within two hours. A clear, colorless, neutral reaction solution is obtained which yields gelatinous aluminium hydroxide by adding water. The solvent is removed by distillation while avoiding access of air humidity. A viscous liquid being soluble in many organic solvents is thus obtained.

*Example 6*

162 grams of sublimated ferric chloride are dissolved in 200 grams of lauric acid at 45° C., mixed with 50 grams of benzene, and 220 grams of ethylene oxide are introduced into the solution within 5 hours. Ethylene oxide is added with cooling so as to prevent the temperature exceeding 50° C. A deep brown solution containing 12.5% of $Fe_2O_3$ is obtained.

The products obtained according to the preceding examples in a practically quantitative yield decompose on heating to temperatures below their boiling point.

I claim:
1. Process for the preparation of organometallic alcoholates which comprises reacting at least 3 mols of an alkylene oxide with 1 mol of an anhydrous halide selected from the group consisting of halides of iron and aluminum in the presence of an organic solvent at temperatures not exceeding 50° C.

2. Process according to claim 1 in which said alkylene oxide is dissolved in said organic solvent.

3. Process according to claim 1 in which said anhydrous halide is anhydrous ferric chloride.

4. Process according to claim 3 in which said alkylene oxide is propylene oxide.

5. Process according to claim 1 in which said anhydrous halide is aluminium chloride.

6. Process according to claim 5 in which said alkylene oxide is epichlorohydrin.

References Cited in the file of this patent

UNITED STATES PATENTS

| 1,944,274 | Salzberg | Jan. 23, 1934 |
| 2,054,099 | Rothrock | Sept. 15, 1936 |
| 2,511,013 | Rust et al. | June 13, 1950 |

OTHER REFERENCES

Gardner et al., Circular No. 366 Scientific Section Educational Bureau American Paint and Varnish Manufacturers Association; issued July, 1930, pages 327–337.

Smith et al., Journal Am. Chem. Soc., vol. 53, pages 3476–3477 (1931).

Darmstaedter, Annalen Der Chemie and Pharmacie, vol. 148, pages 123–124 (1868).